United States Patent
Chang et al.

(10) Patent No.: US 8,260,154 B2
(45) Date of Patent: Sep. 4, 2012

(54) DIGITAL EQUALIZATION APPARATUS AND METHOD FOR COHERENT OPTICAL RECEIVER

(75) Inventors: Sun-hyok Chang, Deajeon-si (KR); Hwan-seok Chung, Daejeon-si (KR); Kwang-joon Kim, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 310 days.

(21) Appl. No.: 12/643,087

(22) Filed: Dec. 21, 2009

(65) Prior Publication Data

US 2011/0008059 A1 Jan. 13, 2011

(30) Foreign Application Priority Data

Jul. 10, 2009 (KR) .................. 10-2009-0063202

(51) Int. Cl.
*H04B 10/06* (2006.01)
(52) U.S. Cl. ......... 398/202; 398/147; 398/154; 398/159
(58) Field of Classification Search .................. 398/147, 398/152, 158, 159, 154, 202
See application file for complete search history.

(56) References Cited

U.S. PATENT DOCUMENTS

| | | | |
|---|---|---|---|
| 7,035,548 B2 * | 4/2006 | Ooi et al. | 398/159 |
| 7,266,310 B1 | 9/2007 | Savory et al. | |
| 7,701,842 B2 * | 4/2010 | Roberts et al. | 370/210 |
| 8,078,065 B2 * | 12/2011 | Koc | 398/208 |
| 2007/0092259 A1 * | 4/2007 | Bontu et al. | 398/147 |
| 2008/0205905 A1 | 8/2008 | Tao et al. | |

OTHER PUBLICATIONS

Sun Hyok Chang, et al; "Digital non-data-aided symbol synchronization in optical coherent intradyne reception", Optics Express, vol. 16, No. 19, Sep. 15, 2008, pp. 15097-15103.

* cited by examiner

*Primary Examiner* — M. R. Sedighian
(74) *Attorney, Agent, or Firm* — Ladas & Parry LLP

(57) ABSTRACT

Disclosed are a digital equalization apparatus for a coherent optical receiver and a digital equalization method for a coherent optical receiver, capable of compensating for chromatic dispersion and polarization impairment through a digital signal processing, and capable of performing a clock recovery and a data recovery through a digital symbol synchronization. The digital equalization apparatus and the method compensate for various impairments occurring on an optical path in a digital manner and achieve synchronization through a simple structure.

5 Claims, 8 Drawing Sheets

FIG.3
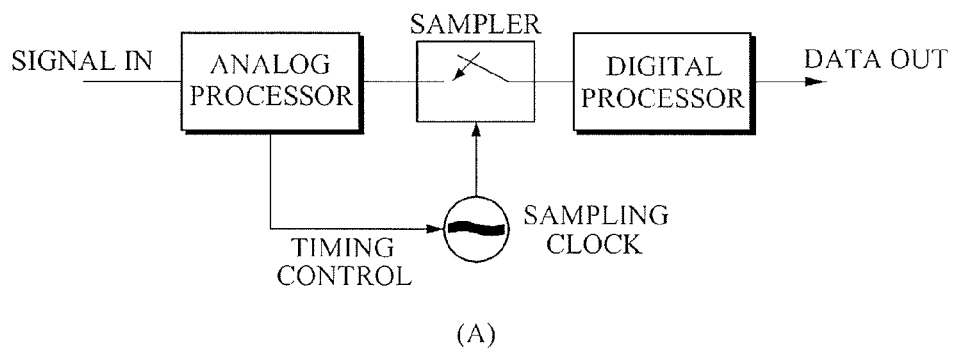
(A)
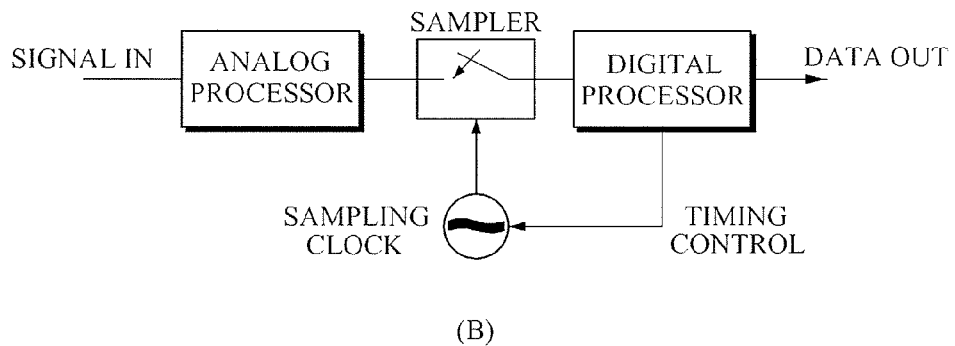
(B)
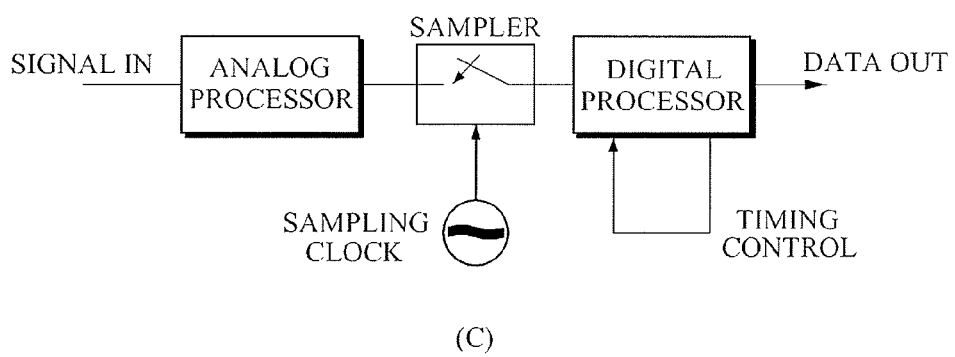
(C)

DIGITAL EQUALIZATION APPARATUS AND METHOD FOR COHERENT OPTICAL RECEIVER

CROSS-REFERENCE TO RELATED APPLICATION

This application claims the benefit under 35 U.S.C. §119(a) of Korean Patent Application No. 10-2009-0063202, filed on Jul. 10, 2009, the disclosure of which is incorporated by reference in its entirety for all purposes.

BACKGROUND

1. Field

The following description relates to an equalization technology for a coherent optical receiver used in optical communications.

2. Description of the Related Art

Coherent optical communication is a type of communication method that performs signal reception in a manner that input optical signals interfere with an optical source of a local oscillator signal and intensity variation and phase variation of the optical signals and phase variation are detected.

The coherent optical communication achieves higher receiver sensitivity and is more robust against noise such as amplified spontaneous emission (ASE) as compared to direct detection, and as such coherent optical communication has garnered a large amount of interest and many studies have been undertaken recently on this technology.

In general, an optical receiver for a coherent optical communication is provided with an optical phase-locked loop (PLL) or an optical polarization controller to process received optical signals. In addition, the optical receiver may be provided with an equalizer to compensate for impairment occurring on an optical path, such as chromatic dispersion and polarization mode dispersion.

In order for the optical receiver to process optical signals, a configuration to control a phase or a polarization of light is required. In general, the phase control or the polarization control has been performed in optical domains. However recently, with the development of digital signal processing technologies, an attempt to control phase or polarization of light has been made in a digital manner.

Meanwhile, for the purpose of synchronization of received signals in the optical receiver, a clock signal is recovered from the received signal and the received signal is recovered based on the recovered clock signal.

SUMMARY

Accordingly, in one aspect, there are provided an equalization apparatus and an equalization method for a coherent optical receiver, in which chromatic dispersion and polarization impairment are compensated for in a digital manner, and a digital symbol synchronization processing is implemented.

In one general aspect, there is provided an equalization apparatus for a coherent optical receiver including a photoconverter to convert a received optical signal into a digital signal; and a signal processor to compensate for chromatic dispersion and polarization dispersion in the optical signal by processing the converted digital signal and to perform symbol synchronization in a digital manner by use of a clock different from a sampling clock of the photoconverter.

The signal processor performs a clock recovery and a data recovery independent from an optical converter.

The signal processor includes a chromatic dispersion compensation unit to receive an output of the photoconverter and compensate for the chromatic dispersion; a digital symbol synchronization unit to receive an output of the chromatic dispersion compensation unit and perform the symbol synchronization; a polarization compensation unit to receive an output of the digital symbol synchronization unit and compensate for the polarization impairment; and a frequency and phase compensation unit to receive an output of the polarization compensation unit and compensate for frequency difference and phase noise between a local oscillation signal of the photoconverter and the optical signal.

The digital symbol synchronization unit includes an interpolation unit to perform interpolation on the output signal of the chromatic dispersion unit; and a clock determination unit to determine an operation clock for the interpolation unit by detecting timing error of the interpolation unit and using the detected timing error. The interpolation unit samples data in a middle of a symbol based on the operation clock.

In another general aspect, there is provided an equalization method for a coherent optical receiver. The method is performed as follows. A received optical signal is converted into a digital signal. Chromatic dispersion of the optical signal is compensated for. Symbol synchronization is performed on the signal, which has been compensated for chromatic dispersion, in a digital manner. Polarization impairment of the optical signal is compensated for. Frequency difference and phase noise between the optical signal and a local oscillation signal, which is used to convert the optical signal into the digital signal, is compensated for.

According to the present invention, various kinds of impairments generated on an optical path are compensated for, thus the efficiency of optical communication is enhanced. In addition, the use of digital equalization scheme simplifies the structure of the equalization apparatus and enhances the equalization efficiency.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 3 is a conceptual diagram of an exemplary synchronization.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, an exemplary equalization apparatus will be described with reference to accompanying drawings.

Figure 1:
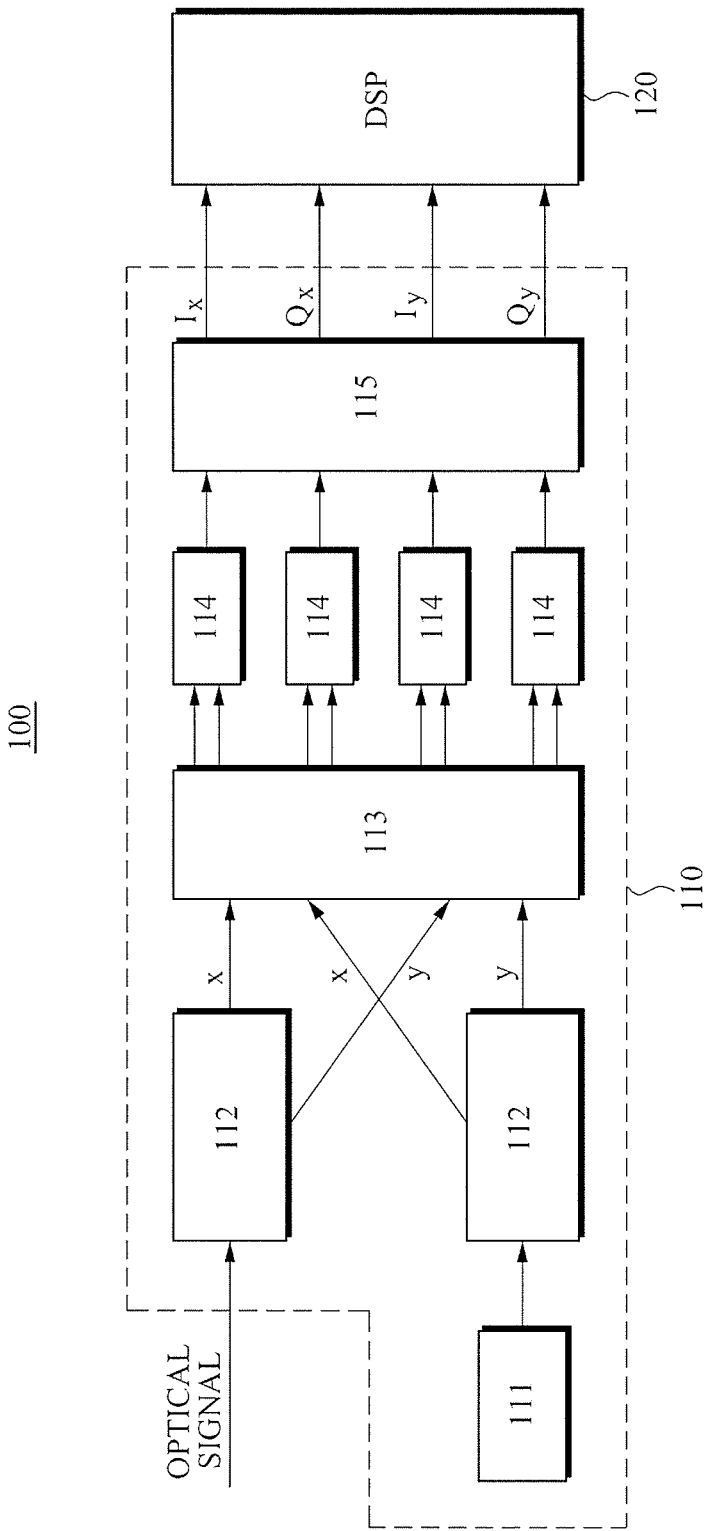
FIG. 1 is a block diagram showing an exemplary digital equalization apparatus for a coherent optical receiver.

FIG. 1 is a block diagram showing an exemplary digital equalization apparatus for a coherent optical receiver.

As shown in FIG. 1, the equalization apparatus 100 includes a photoconverter 110 and a signal processor 120.

The photoconverter 110 converts received optical signals into digital signals. For example, if the optical signal is a coherent optical signal modulated in a phase shift keying (PSK) scheme, the photoconvertor 110 splits the received optical signal into polarization component and generates I-channel signals (In phase signal) and Q-channel signals (Quadrature phase signal) from each polarization component. As shown in FIG. 1, the digital signals generated by the photoconverter 110 are represented in the form of $I_x$, $Q_x$, $I_y$ and $Q_y$. In this case, I and Q indicate an I-channel signal and a Q-channel signal, respectively, and x and y indicate an x-polarization signal and a y-polarization signal, respectively.

The photoconverter 110 includes a local oscillation unit 111, an optical splitting unit 112, an optical mixing unit 113, a photo-receiver unit 114 and an analog-digital converter (ADC) 115.

A received optical signal is split into two polarization components by the optical splitting zo unit 112, and a local oscillation signal generated from the local oscillation unit 111 is also split into two polarization components by the optical splitting unit 112. The optical splitting unit 112 may be implemented using a polarization beam splitter (PBS). The optical splitting unit 112 splits a received signal into an x-polarization component and a y-polarization component.

The x-polarization component and the y-polarization component of each of the optical signal and the local oscillation signal are input into the optical mixing unit 113. The optical mixing unit 113 mixes each polarization component of the optical signal with each polarization component of the local oscillation signal. The optical mixing unit 113 may be implemented using an optical hybrid which mixes signals to output signals having a phase difference of 90°.

The output of the optical mixing unit 113 is input into the photo-receiver unit 114. The photo-receiver unit 114 may be implemented as a photo-receiver which converts received signals into electric signals. Since I-channel signals and Q-channel signals are generated corresponding to both polarization components, the output from the photo-receiver unit 114 are represented as four types of signals including $I_x$, $Q_x$, $I_y$ and $Q_y$.

The signals $I_x$, $Q_x$, $I_y$ and $Q_y$ are input into the ADC 115, and the ADC 115 samples the signals ($I_x$, $Q_x$, $I_y$ and $Q_y$), so that the signals $I_x$, $Q_x$, $I_y$ and $Q_y$ are converted into digital signals. In the present embodiment, the sampling rate of the ADC 115 is independent from the symbol rate of the optical signals. For example, the sampling rate of the ADC 115 is set as a value close to a general sampling rate, that is, a Nyquist rate.

The digital signals of the ADC 115 are input into the signal processor 120. The signal processor 120 demodulates and decodes the optical signals through a digital signal processing.

In detail, the signal processor 120 processes the digital signal converted in the photoconverter 110 to compensate for chromatic dispersion and polarization impairment of the optical signals. In addition, the signal processor 120 performs a symbol synchronization in a digital manner by use of a clock signal independent from a sampling clock signal of the photoconverter 110 (hereinafter the term "clock signal" may be referred simply to as "clock" for ease of reference).

For example, in the symbol synchronization, the signal processor 120 performs clock recovery and data recovery independent from a sampling clock of the ADC 115.

Figure 2:
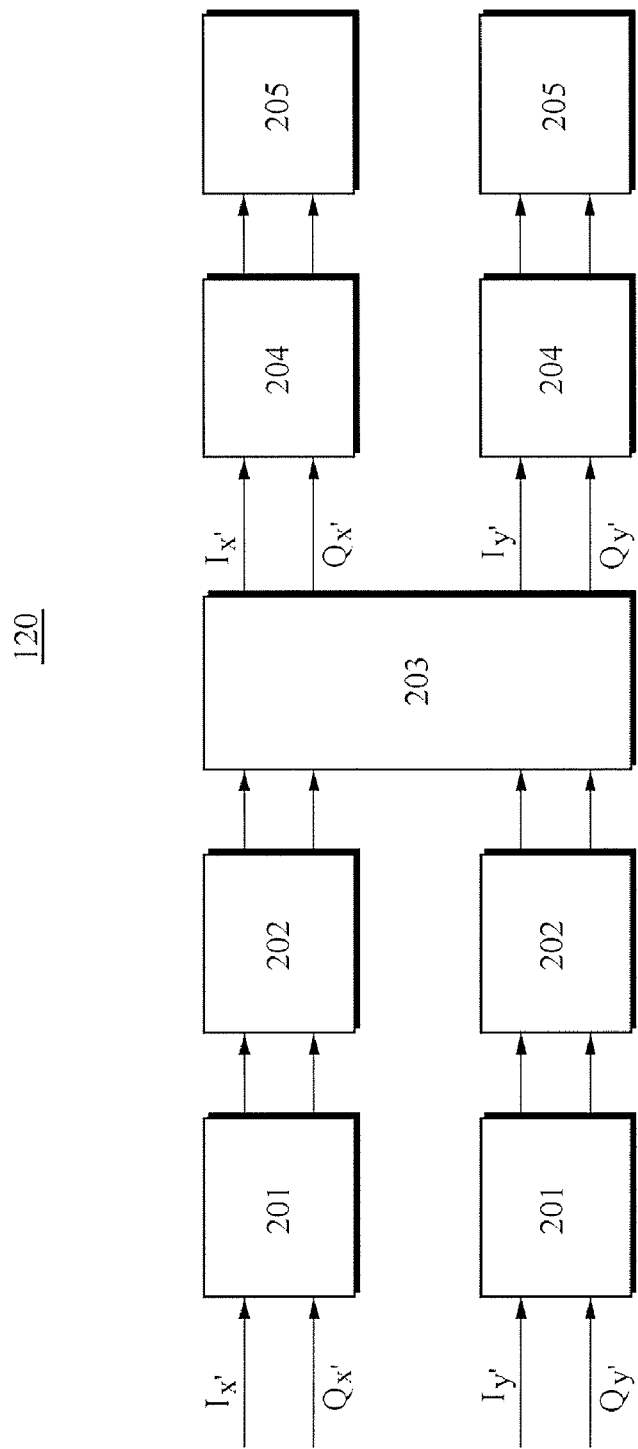
FIG. 2 is a block diagram showing an exemplary signal processor.

FIG. 2 is a block diagram showing an exemplary signal processor.

As shown in FIG. 2, the exemplary signal processor 120 includes a chromatic dispersion compensation unit 201, a digital symbol synchronization unit 202, a polarization compensation unit 203, a frequency and phase compensation unit 204 and a decoding unit 205.

Each of the chromatic dispersion compensation unit 201, the digital symbol synchronization unit 202 and the frequency and phase compensation unit 204 is subdivided corresponding to each of the polarization component. In addition, a signal processing for the I-channel signals is separately performed from a signal processing for the Q channel signals.

The chromatic dispersion compensation unit 201 processes the output of the photoconverter 110 to compensate for chromatic dispersion in the optical signals. Since the chromatic dispersion has a linear characteristic, the chromatic dispersion can be compensated for based on a chromatic dispersion value of optic fiber constituting a transmission path. For example, the chromatic dispersion may be compensated for through a finite impulse response (FIR) filter having a filter coefficient derived from a chromatic dispersion value of optical fiber.

The digital symbol synchronization unit 202 processes the output of the chromatic dispersion compensation unit 201 to perform digital symbol synchronization. In a conventional optical receiver, a clock signal is recovered from a received signal for the purpose of synchronization, and the recovered clock signal is used to recover the received signal. In this case, a process of recovering a clock signal is referred to as clock recovery, and a process of recovering a received signal is referred to as data recovery. The digital symbol synchronization unit 202 simultaneously performs the clock recovery and the data recovery in a digital manner.

In the present embodiment, the digital symbol synchronization unit 202 samples a predetermined data in a symbol. In this case, sampling timing of the digital symbol synchronization unit 202 is independent from sampling timing of the ADC 115, and is determined based on timing error detection and a feedback of detected timing error.

The polarization compensation unit 203 processes signals, which have been subject to digital symbol synchronization, to compensate for polarization impairment. The polarization impairment may refer to polarization mode dispersion (PMD) or polarization dependent loss (PDL). For example, when an optical signal is split into two polarization components by the optical splitter 112, one of the polarization components may contain a modulated x-polarization component (referred to as 'x'') and a modulated y-polarization component (referred to as 'y''). The polarization compensation unit 203 separates the modulated polarization components (x' and y') from an x-polarization signal or a y-polarization signal.

The output of the polarization compensation unit 203 is input into the frequency and phase compensation unit 204. According to the present embodiment, a received optical signal may interfere with a local oscillation signal generated from the local oscillation unit 111 (see FIG. 1). In that case, a laser frequency difference between the optical signal and the local oscillation signal may be generated. The frequency and phase compensation unit 204 compensates for the laser frequency difference by estimating a laser frequency offset. In addition, since the optical signal and the local oscillation signal have a finite laser linewidth, a phase noise may be generated. The frequency and phase compensation unit 204 compensates for such phase noise.

In this regard, output signals of the frequency and phase compensation unit 204 may have phase information identical to phase information of signals that are originally output from a sending end. The output signals of the frequency and phase compensation unit 204 are input into the decoding unit 205, and the decoding unit 205 extracts a bit sequence from phase information of the signals.

FIG. 3 is a conceptual diagram of exemplary symbol synchronization.

An analog signal is converted into a digital signal by a sampler such as an analog-digital converter (ADC). In this case, the sampler needs to determine a clock for a symbol synchronization between a sending party and a receiving party. Methods of determining a clock and performing symbol synchronization are classified into three types including an analog method, a hybrid method and a digital method.

In the analog method (a), a clock is generated in an analog manner, and sampling is performed in an analog manner based on the generated clock. In the hybrid method (b), a clock is generated in a digital manner, and sampling is performed in an analog manner based on the recovered clock. In the digital method (c), a clock used in a sampler is arbitrarily provided, and clock recovery and sampling are simultaneously performed.

For example, in the exemplary digital equalization apparatus 100 employing the digital method (c), the sampling rate of the ADC 115 is set as a predetermined value satisfying Nyquist Theory. The symbol synchronization is performed in the signal processor 120 independent from the sampling rate of the ADC 115.

Figure 4:
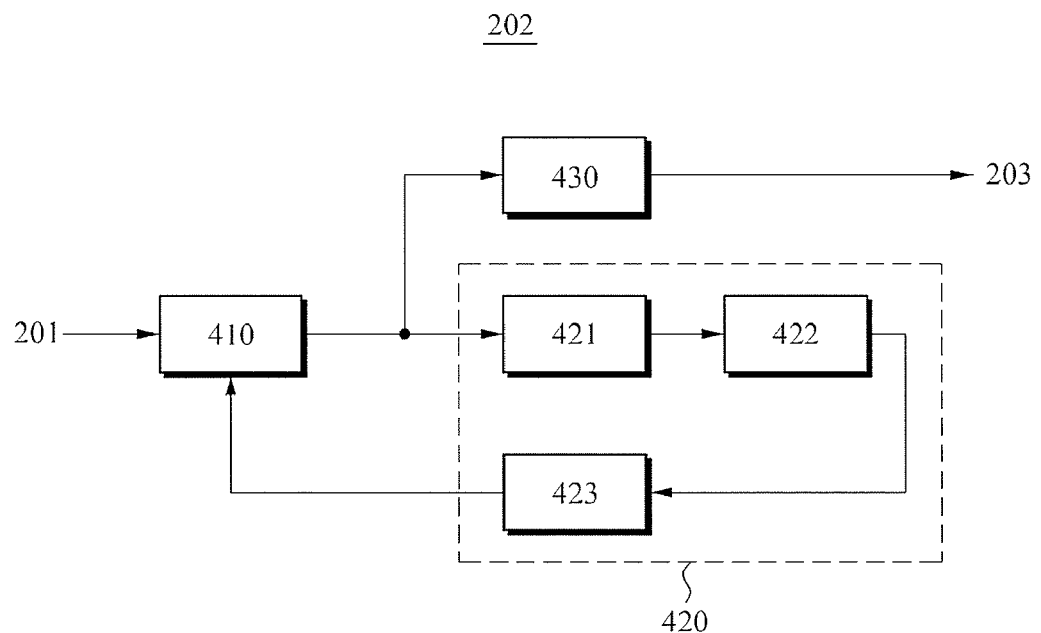
FIG. 4 is a block diagram showing an exemplary digital symbol synchronization unit.

FIG. 4 is a block diagram showing an exemplary digital symbol synchronization unit.

As shown in FIG. 4, the digital symbol synchronization unit 202 includes an interpolation unit 410, a clock determination unit 420 and a decimation filter unit 430.

The interpolation unit 410 performs an interpolation on the output signal of the chromatic dispersion compensation unit 201. For example, the interpolation unit 410 calculates values between sample values and generates a sequence of digital signals. The generated digital signal sequence passes through the decimation filter unit 430 and then input into the polarization compensation unit 203 in the form in which each symbol corresponds to one sample.

The clock determination unit 420 determines a clock and applies the determined clock to the interpolation unit 410. The clock determination unit 420 calculates a clock allowing the interpolation unit 410 to sample data in the middle of the symbol.

For example, if an optical signal is a PSK-modulated signal, a timing error detector 421 calculates timing error by use of PSK signal characteristics. A loop-filter 422 having a proportional-and-integral structure controls a generation period of the clock in a timing processor 423 by use of the calculated timing error. A clock generated from the timing processor 423 is input into the interpolation unit 410, and the interpolation unit 410 samples data in the middle of a symbol based on the applied clock.

The timing error represents an extent by which sampling timing deviates from optimum sampling timing. For example, since samples may have inaccurate values in a symbol transition region, the timing error indicates an extent by which samples deviate from the middle of the symbol. The timing error detector 421 calculates timing error by searching for a symbol transition location and a symbol center.

In this manner, the symbol rate for signals is determined independent from the sampling rate of the ADC 115. Accordingly, even if the sampling frequency is different from the symbol rate due to external conditions, symbol synchronization can be stably achieved.

Figure 5:
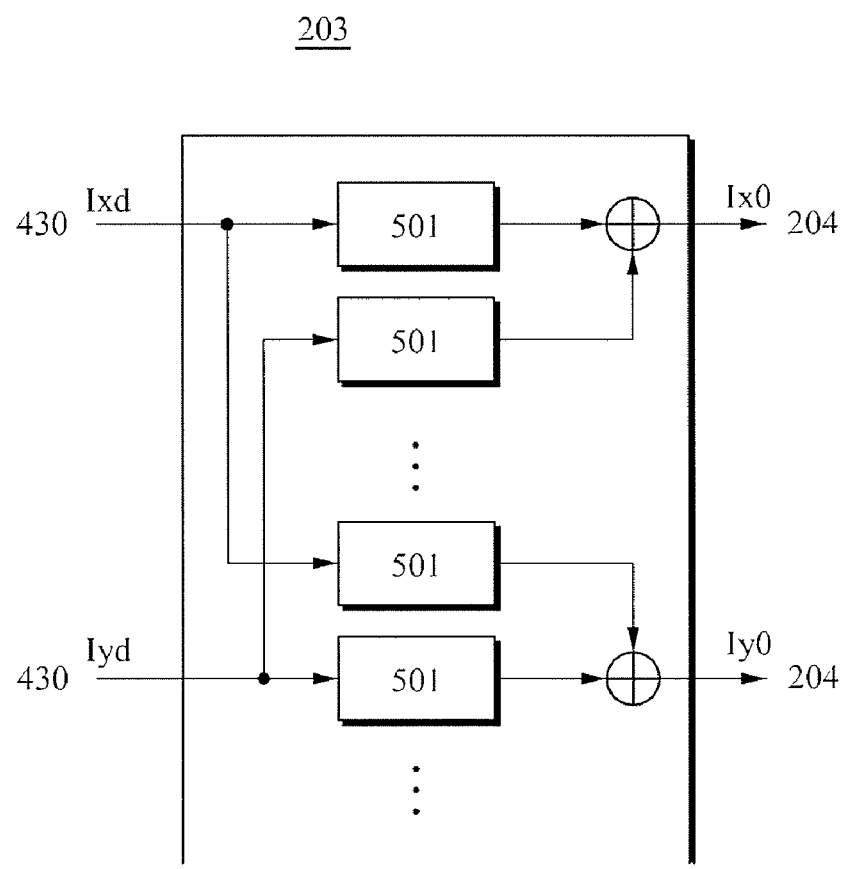
FIG. 5 is a block diagram showing an exemplary polarization compensation unit.

FIG. 5 is a block diagram showing an exemplary polarization compensation unit.

As shown in FIG. 5, the polarization compensation unit 203 extracts a polarization component of modulated signals. For example, in FIG. 5, $I_{xd}$ and $I_{yd}$ represent outputs of the decimation filter 430 of the digital symbol synchronization unit 202, respectively, $I_{xO}$ and $I_{yO}$ represents polarization components of modulated signals, respectively.

In the case that an input optical signal is a PSK modulated signal, the polarization compensation unit 203 adaptively obtains coefficients of a finite impulse response (FIR) filter 501 in a constant modulus algorithm (CMA) scheme.

Figure 6:
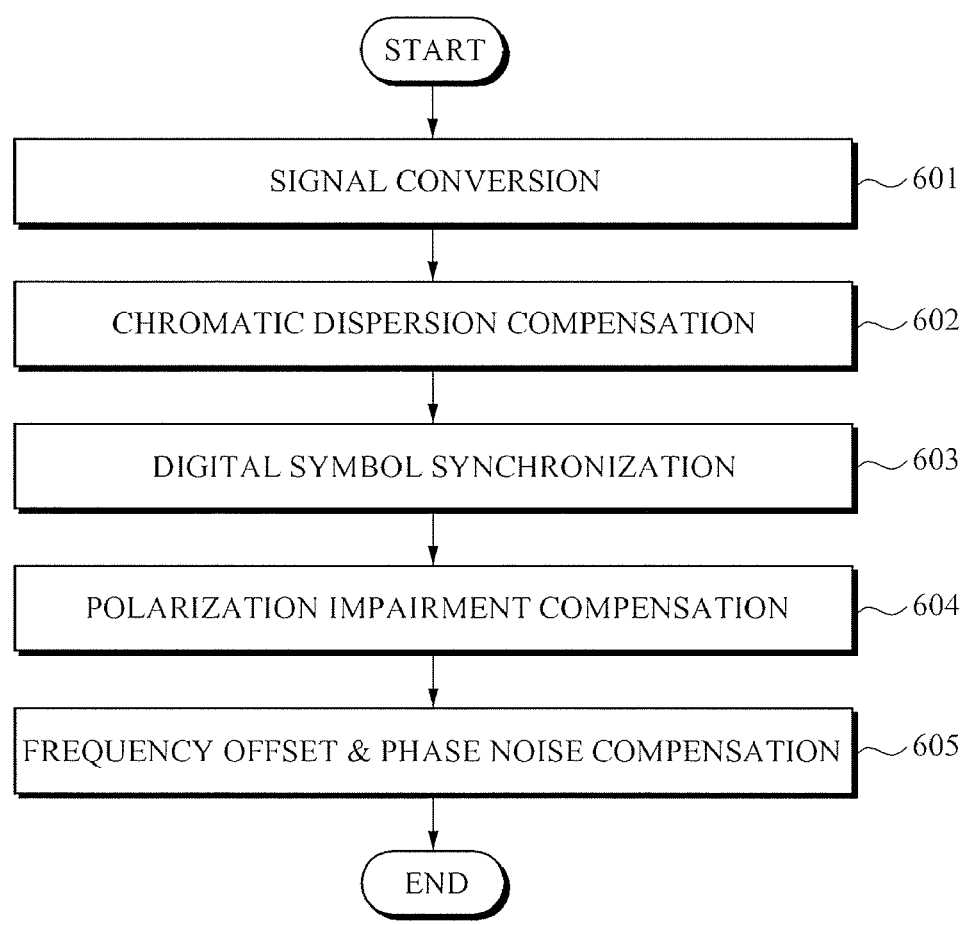
FIG. 6 is a view showing an exemplary digital equalization method for a coherent optical receiver.

FIG. 6 is a view showing an exemplary digital equalization method for a coherent optical receiver. The digital equalization method for a coherent optical receiver will be described with reference to FIG. 6.

First, a received optical signal is converted into a digital signal (operation 601). For example, the photoconverter 110 splits each of an optical signal and a local oscillation signal into an x-polarization component and a y-polarization component. An I-channel signal and a Q-channel signal for each polarization component are generated. The photo-receiver unit 114 detects the I-channel signals and Q-channel signals to generate analog signals. The analog signals are converted into digital signals through the ADC 115.

After that, the chromatic dispersion of optical signals is performed (operation 602). For example, the chromatic dispersion compensation unit 201 compensates for chromatic dispersion based on chromatic dispersion values of optic fiber constituting a transmission path.

Then, symbol synchronization is performed on signals, which have been subject to the chromatic dispersion, in a digital manner (operation 603). For example, the digital symbol synchronization unit 202 simultaneously performs a clock recovery and a data recovery in a digital manner. In the case that the optical signal is a PSK signal, the symbol synchronization is performed as follows. Interpolation is performed on the signals such that data is sampled in the middle of a symbol. Timing error of an interpolation signal is detected. Interpolation timing is determined by use of the detected timing error.

After that, polarization impairment of the optical signals is compensated for (operation 604). For example, the polarization compensation unit 203 separates polarization components of modulated signals.

Finally, a frequency difference and phase noise are compensated for (operation 605). For example, the frequency and phase compensation unit 205 estimates and compensates for a laser frequency offset between an optical signal and a local oscillation signal and phase noise due to the finite laser linewidth.

Figure 7:
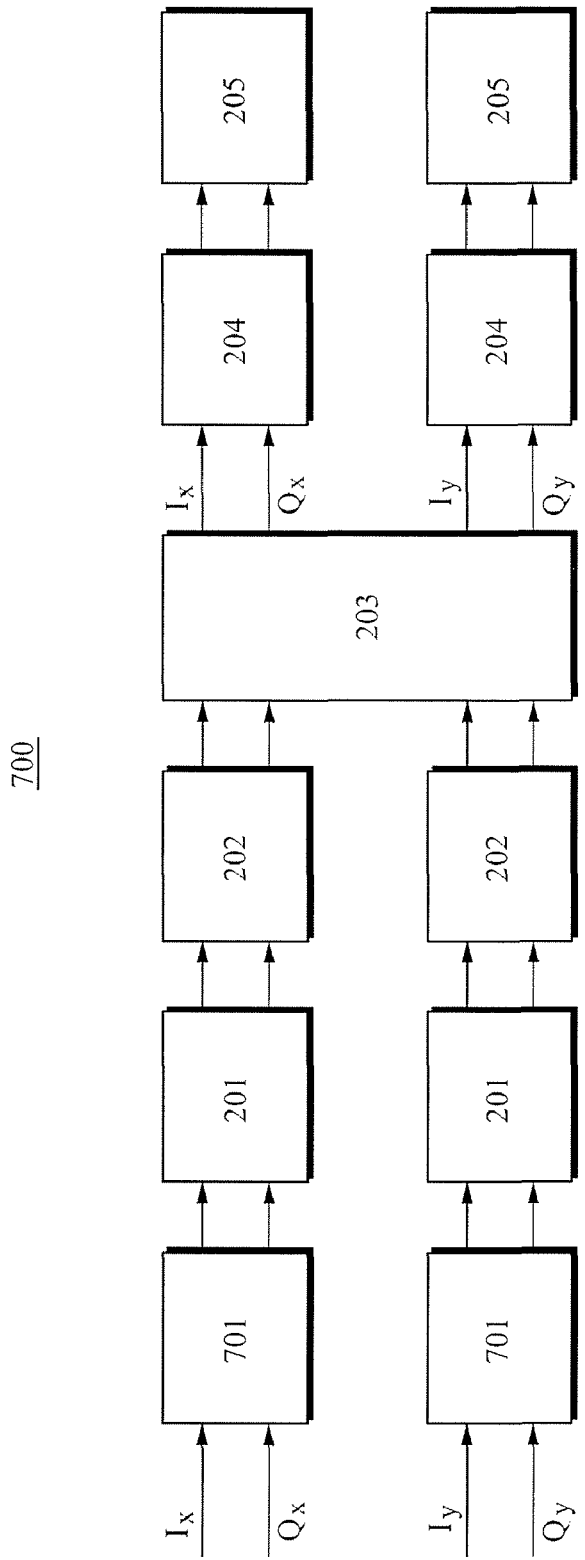
FIG. 7 is a block diagram showing another exemplary digital equalization apparatus for a coherent optical receiver.

FIG. 7 is a block diagram showing another exemplary signal processor. As shown in FIG. 7, a signal processor 700 may further include a signal conditioning unit (701) in addition to the components shown in FIG. 2. If necessary, the signal conditioning unit 701 may perform various kinds of pre-processing. For example, the signal conditioning unit 701 may perform a normalization, a compensation for IQ-mismatch and a linear transformation on input signals.

Figure 8:
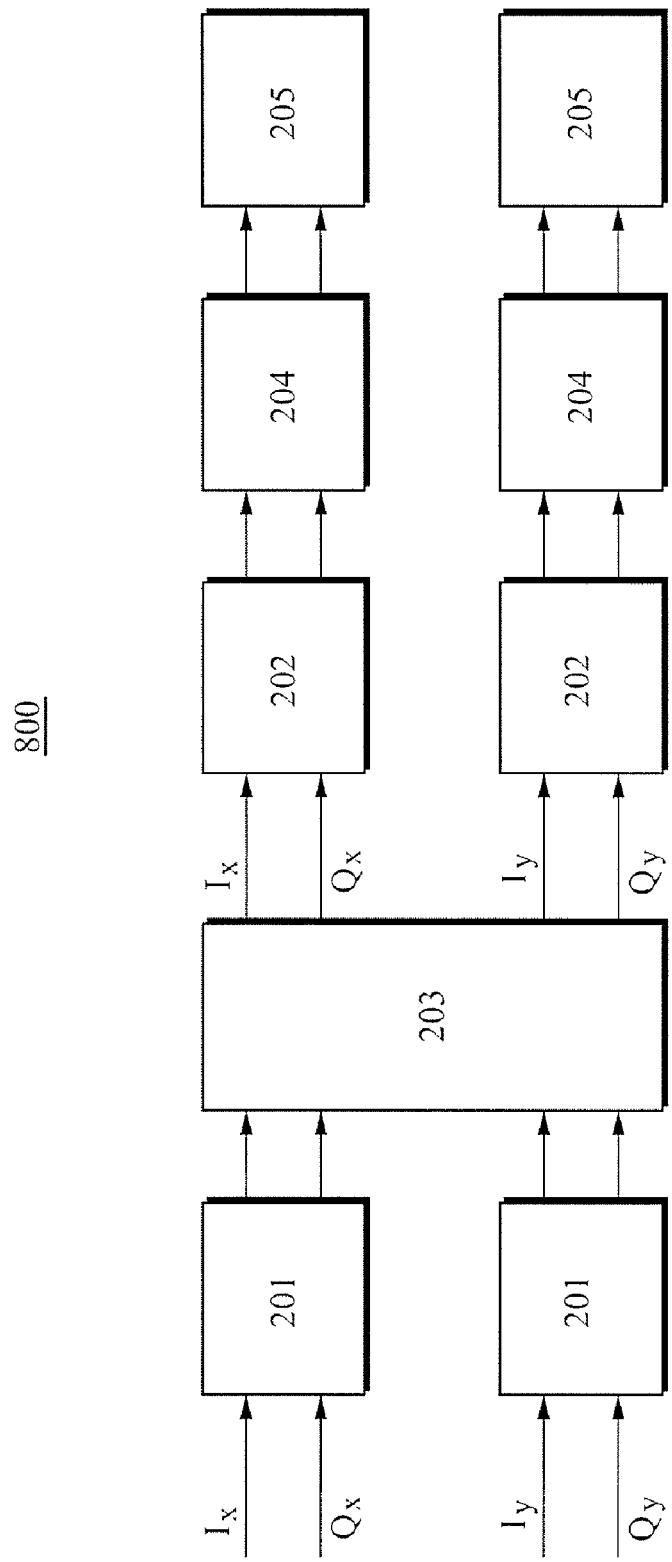
FIG. 8 is a block diagram showing still another exemplary digital equalization apparatus for a coherent optical receiver.

FIG. 8 is a block diagram showing still another exemplary signal processor.

As shown in FIG. 8, a signal processor 800 includes the chromatic dispersion compensation unit 201, the polarization compensation unit 203, the digital symbol synchronization unit 202, the frequency and phase compensation unit 204 and the decoding unit 205.

Since the description of the components is identical to that described with reference to FIG. 2, details will be omitted in order to avoid redundancy, and will be described in conjunction with FIG. 2. In FIG. 2, the signal processor 120 compensates for chromatic dispersion, performs symbol synchronization and then performs polarization compensation. However, in FIG. 8, the signal processor 800 compensates for chromatic dispersion, performs polarization compensation and then performs symbol synchronization.

The sequence of operations including the chromatic dispersion compensation, the symbol synchronization and the polarization compensation is not limited to the present embodiment. For example, in FIGS. 6 and 7, the chromatic dispersion compensation, the symbol synchronization and the polarization compensation may be performed in a predetermined order suitable for the system performance and the required use.

The disclosure can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A digital equalization apparatus for a coherent optical receiver, the digital equalization apparatus comprising:
    a photoconverter to convert a received optical signal into a digital signal; and
    a signal processor to compensate for chromatic dispersion and polarization dispersion in the optical signal by processing the converted digital signal and to perform symbol synchronization in a digital manner by use of a clock different from a sampling clock of the photoconverter,
    wherein the signal processor comprises:
    a chromatic dispersion compensation unit to receive an output of the photoconverter and compensate for the chromatic dispersion;
    a digital symbol synchronization unit to receive an output of the chromatic dispersion compensation unit and perform the symbol synchronization;
    a polarization compensation unit to receive an output of the digital symbol synchronization unit and compensate for the polarization impairment; and
    a frequency and phase compensation unit to receive an output of the polarization compensation unit and compensate for frequency difference and phase noise between a local oscillation signal of the photoconverter and the optical signal,
    wherein the digital symbol synchronization unit comprises: an interpolation unit to perform interpolation on the output signal of the chromatic dispersion unit; and a clock determination unit to determine an operation clock for the interpolation unit by detecting timing error of the interpolation unit and using the detected timing error.

2. The equalization apparatus of claim 1, wherein the interpolation unit samples data in a middle of a symbol based on the operation clock.

3. The equalization apparatus of claim 1, wherein the photoconverter comprises an analog-digital converter, and wherein
    the digital symbol synchronization unit performs clock recovery and data recovery independent from a sampling clock of the analog-digital converter.

4. The equalization apparatus of claim 1, wherein the chromatic dispersion compensation unit, the digital symbol synchronization unit and the frequency and phase compensation unit are provided for individual polarization components of the optical signal.

5. The equalization apparatus of claim 1, wherein the optical signal is a phase-shift keying (PSK) modulated signal.

* * * * *